United States Patent
Pifferi

[15] 3,696,096
[45] Oct. 3, 1972

[54] SUBSTITUTED 2-BENZOYL- AND 2-CINNAMOYL-ISOXAZOLIDINES

[72] Inventor: Giorgio Pifferi, Via G.B. Morini 22, Moroni, Italy

[73] Assignee: Gruppo Lepetit S.p.A., Milan, Italy

[22] Filed: March 26, 1970

[21] Appl. No.: 23,009

[52] U.S. Cl. .............260/240 J, 260/307 F, 424/272
[51] Int. Cl. ..............................................C07d 85/08
[58] Field of Search.............260/240 J, 307 F, 307 H

[56] References Cited

UNITED STATES PATENTS 3,268,407   8/1966   Hofmann.....................167/65

*Primary Examiner*—Henry R. Jiles
*Assistant Examiner*—G. Thomas Todd
*Attorney*—Griswold and Burdick

[57] ABSTRACT

A new class of 2-aroyl- and 2-cinnamoyl-isoxazolidines exhibiting selective activity on the anxious response in laboratory animals.

7 Claims, No Drawings

SUBSTITUTED 2-BENZOYL- 2-CINNAMOYL-ISOXAZOLIDINES

This invention is concerned with novel isoxazolidine derivatives and with a method for their preparation. More particularly this invention is directed to compounds having the formula

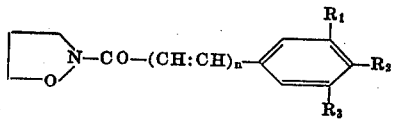

wherein $n$ represents one of the integers zero and 1, and $R_1$, $R_2$, $R_3$ each independently represent hydroxy, one to three carbon alkoxy and acetoxy, no more than one of which groups is hydrogen.

The novel isoxazolidine compounds exhibit central nervous system activity as indicated by their effectiveness in the pole climbing avoidance test in rats. The unique property of the novel compounds is that while they display a high degree of activity in said test, they have practically no activity when tested for their psycho-sedative and neuro-depressant effect on mice. This property, combined with a low degree of toxicity, allows classification of the compounds as selective psycho-active. In other words, the compounds influence the anxious behavior without impairing consciousness and without untoward muscular effects.

The novel compounds are prepared by contacting isoxazolidine either as free base or in the form of its addition salts with acids, with an acyl chloride of the formula

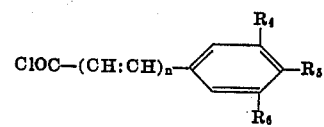

wherein $n$ has the above significance and $R_4$, $R_5$ and $R_6$ each independently represent alkoxy and acyloxy, in the presence of an organic nitrogen base. The reaction is carried out in an organic anhydrous solvent. The reaction proceeds at a temperature ranging from about 0°C to the boiling temperature of the reaction mixture. Room temperature is preferably used as the lower limit.

The exact amount of the reagent is not critical, however the best results are observed by using substantially equimolecular ratios of isoxazolidine and of the acyl chloride, while the nitrogen organic base is added in more or less important excess and preferably in the ratio of 1.1 – 1.5 moles for each equivalent of the total acid present at the end of the reaction. When one or more substituents linked to the benzene ring of the starting acyl chloride are acyloxy groups, the compound obtained according to the above process may be optionally subjected to alkaline hydrolysis, whereby the acyl group is split off and the corresponding phenol is obtained. This step is effected according to conventional procedures, for instance by employing as the hydrolizing agent an excess of a base selected from ammonium hydroxides and alkali metal hydroxides in an aqueous medium. However, organic bases were also found to be operative.

Typical compounds which can be prepared according to the procedure hereinbefore described are listed below, without any intention of establishing the limits of the invention.

-2-(3,4,5-Trimethoxybenzoyl)-isoxazolidine
-2-(3,4-Dimethoxybenzoyl)-isoxazolidine
-2-(4-Acetoxy-3,5-dimethoxybenzoyl)-isoxazolidine
-2-(3,5-Dimethoxy-4-hydroxybenzoyl)-isoxazolidine
-2-(3,4,5-Trihydroxybenzoyl)-isoxazolidine
-2-(3,4,5-Triacetoxybenzoyl)-isoxazolidine
-2-(3,4,5-Triethoxybenzoyl)-isoxazolidine
-2-(3,4-Diethoxybenzoyl)-isoxazolidine
-2-(4-Acetoxy-3,5-diethoxybenzoyl)-isoxazolidine
-2-(3,5-Diethoxy-4-hydroxybenzoyl)-isoxazolidine
-2-(3,4,5-Tripropoxybenzoyl)-isoxazolidine
-2-(3,4-Dipropoxybenzoyl)-isoxazolidine
-2-(4-Acetoxy-3,5-dipropoxybenzoyl)-isoxazolidine
-2-(3,5-Dipropoxy-4-hydroxybenzoyl)-isoxazolidine
-2-(3,4,5-Trimethoxycinnamoyl)-isoxazolidine
-2-(3,4Dimethoxycinnamoyl)-isoxazolidine
-2-(4-Acetoxy-3,5-dimethoxycinnamoyl)-isoxazolidine
-2-(3,5-Dimethoxy-4-hydroxycinnamoyl)-isoxazolidine
-2-(3,4,5-Trihydroxycinnamoyl)-isoxazolidine
-2-(3,4,5Triacetoxycinnamoyl)-isoxazolidine
-2-(3,4,5-Triethoxycinnamoyl)-isoxazolidine
-2-(3,4-Diethoxycinnamoyl)-isoxazolidine
-2-(4-Acetoxy-3,5-diethoxycinnamoyl)-isoxazolidine
-2-(3,5-Diethoxy-4-hydroxycinnamoyl)-isoxazolidine
-2-(3,4,5-Tripropoxycinnamoyl)-isoxazolidine
-2-(3,4-Dipropoxycinnamoyl)-isoxazolidine
-2-(4-Acetoxy-3,5-dipropoxycinnamoyl)-isoxazolidine
-2-(3,5-Dipropoxy-4-hydroxycinnamoyl)-isoxazolidine The invention is illustrated in more detail by the following non-limitative examples.

EXAMPLE 1

-2-(3,4,5Trimethoxybenzoyl)-isoxazolidine

To 219.1 g. of isoxazolidine hydrochloride, dissolved in 3.5 l. of methylene chloride, 620 ml. of triethylamine are slowly added. After stirring for 15 minutes, 461 g. of 3,4,5-trimethoxybenozyl chloride in 2.2 l. of methylene chloride are added during 40 minutes, keeping the temperature below 30°C. The reaction is carried out first at room temperature for 1 hour under stirring, then at the reflux temperature for 2 more hours. The mixture is allowed to cool, then washed with water, 5 percent hydrochloric acid, 5 percent sodium bicarbonate, and finally again with water to neutrality. The organic phase is separated, dried over sodium sulfate and the solvent distilled off in vacuo. The residue consisting of 2-(3,4,5-trimethoxybenzoyl)-isoxazolidine is crystallized from diisopropyl ether. Yield 470 g. (88.0 percent); m.p. 75°–76°C.

Analysis
Calculated for $C_{13}H_{17}NO_5$: C 58.19; H 6.40; N 5.24
Found: C 58.27; H 6.31; N 5.34

EXAMPLE 2

-2-(3,4-Dimethoxybenzoyl)-isoxazolidine

By substantially the same procedure as in example 1, 2-(3,4-dimethoxybenzoyl)-isoxazolidine is prepared by the addition of 6.1 g. of 3,4-dimethoxybenzoyl chloride dissolved in 107 ml. of methylene chloride to a suspension of 3.92 g. of isoxazolidine hydrochloride and 10.2 ml. of triethylamine in 72 ml. of methylene chloride. Yield 4.4 g. (60.7 percent); m.p. 87.5°–88.5°C.

Analysis

Calculated for $C_{12}H_{15}NO_4$: C 60.75; H 6.37; N 5.90
Found: C 60.50; H 6.47; N 6.00

EXAMPLE 3

-2-(4-Acetoxy-3,5-dimethoxybenzoyl)-isoxazolidine

Prepared substantially by the same procedure as in example 1; starting from 4.65 g. of isoxazolidine hydrochloride, 14.3 ml. of triethylamine and 11 g. of 4-acetoxy-3,5-dimethoxybenzoyl chloride. Yield 10 g. (81.7 percent); m.p. 120°–121°C.
Analysis Calculated for $C_{14}H_{17}NO_6$; C 56.94; H 5.80; N 4.74
Found: C 56.70; H 5.86; N 4.86

EXAMPLE 4

-2-(4-Acetoxy-3,5-Dimethoxycinnamoyl-isoxazolidine

Prepared substantially as described in Example 1; starting from 2.96 g. of isoxazolidine hydrochloride, 9.1 ml. of triethylamine and 7.7 g. of 4-acetoxy-3,5-dimethoxycinnamoyl chloride. Yield 5.9 g. (68.0 percent); m.p. 155°–156°C.
Analysis Calculated for $C_{16}H_{19}NO_6$: C 59.78; H 5.96; N 4.36
Found: C 59.64; H 6.04; N 4.43

EXAMPLE 5

-2-(3,5-Dimethoxy-4-hydroxybenzoyl)-isoxazolidine

An amount of 4 g. of 2-(4-acetoxy-3,5-dimethoxybenzoyl)-isoxazolidine is suspended in 40 ml. of water and 20 ml. of concentrated ammonia solution. The suspension is heated to about 80°C to have complete solution of the solid. The hot liquid is filtered and brought to pH 7 with dilute hydrochloric acid, then cooled on ice for 2 hours. The formed crystals, consisting of 2-(3,5-dimethoxy-4-hydroxybenzoyl)-isoxazolidine, are collected by filtering and dried over phosphorus pentoxide. Yield 2.68 g. (78.1 percent); m.p. 75°–76°C.
Analysis Calculated for $C_{12}H_{15}NO_5$: C 56.92; H 5.97; N 5.53
Found: C 56.14; H 6.13; N 5.42

As above stated, the anxious response of the new compounds was indicated by the pole climbing avoidance test in rats. The test was carried out by the Cook and Weidley procedure, Annals N.Y. Acad. Sci. 66 740 (1957), with some modifications described by Maffii in J. Pharm. Pharmacol. 11 129 (1959). The apparatus consists in a box thermally and acoustically isolated provided with a grid of steel rods, as the floor, connected with an electric stimulator. The box also contains a buzzer, and a wooden pole in the center of the pole provides the safety area. Rats escape the electric shocks by climbing the pole. The experimental scheme to which rats are subjected after having been introduced in the box is the following: 15 seconds of silence, 15 seconds of acoustic stimulation, 30 seconds of both electric and acoustic stimulation. The response of the animal interrupts the scheme. Climbing the pole during the silence period is called $CR_2$ (secondary conditioned response), climbing the pole during the acoustic stimulation is called $CR_1$ (primary conditioned response), and climbing during the electric stimulation is called UR (unconditioned response). $CR_2$ is interpreted as anxious response.

The lack of psychosedative, neurosedative and neurovegetative effects in the novel compounds was ascertained through the observation of mice behavior according to the scheme of Irwin, Gordon Res. Conf. Med. Chem., New London, N.M. 3–7/8, 133 (1959). The scheme comprises the systematic observation of groups of 3 mice per dose, treated with increasing doses of the substance. The observed alterations are evaluated.

The lack of effect on arterial pressure was tested on the carotid artery of cats under anesthesia from sodium hexobarbital, 40 mg/Kg intraperitoneally. The products were injected in the femoral artery. A minimum decrease of 20 percent in pressure for at least 20 minutes is considered as significant.

The results in mg/Kg obtained for some representative compounds are given in Table I.

| Compound of Example | Anxious response $ED_{50}$ | | Arterial pressure i.v. | Psychosedative effect $ED_{50}$ | | Neurosedative effect $ED_{50}$ | | Neurovegetative effect $ED_{50}$ | | $LD_{50}$ mice | |
|---|---|---|---|---|---|---|---|---|---|---|---|
| | Os | I.p. | | Os | I.p. | Os | I.p. | Os | I.p. | Os | I.p. |
| 1 | 60 | 25 | >30 | 100 | 80 | 400 | 100 | >300 | 300 | 1,170 | 1,111 |
| 2 | 50 | 25 | >10 | 150 | 100 | 500 | 300 | >300 | 300 | 420 | 300 |
| 3 | 35 | 25 | >10 | 400 | 300 | >1,000 | 1,000 | >1,000 | 1,000 | >1,000 | >1,000 |
| 4 | 80 | 60 | >10 | 400 | 300 | 500 | 300 | 500 | 300 | 650 | 500 |
| 5 | 50 | 25 | >30 | 200 | 100 | >1,000 | 1,000 | >1,000 | 1,000 | >1,000 | >1,000 |
| 6 | 80 | 60 | >10 | 500 | 400 | >1,000 | 1,000 | >1,000 | 1,000 | >1,000 | >1,000 |

EXAMPLE 6

-2-(3,5-Dimethoxy-4-hydroxycinnamoyl)-isoxazolidine

An amount of 2.56 g. of 2-(4-acetoxy-3,5-dimethoxycinnamoyl)-isoxazolidine is suspended in a mixture of 36 ml. of water, 4 ml. of concentrated ammonia solution and 20 ml. of ethanol. The suspension is heated for 2 hours at 60°C, adjusted, while still warm, to pH about 7, then cooled on ice for 3 hours. A precipitate is formed, consisting of 2-(3,5-dimethoxy-4-hydroxycinnamoyl)-isoxazolidine which is collected and dried in an oven. Yield 2.1 g. (94.4 percent); m.p. 166°–167°C.
Analysis Calculated for $C_{14}H_{17}NO_5$: C 60.21; H 6.13; N 5.01
Found: C 59.82; H 6.22; N 4.98

I claim:

1. A compound of the formula

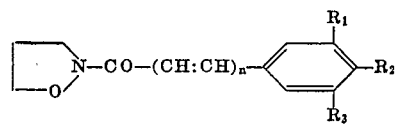

wherein $n$ is 0 or 1 and $R_1$, $R_2$, $R_3$ are members of the class consisting of hydrogen, hydroxy, one to three carbon alkoxy and acetoxy, no more than one of which is hydrogen.

2. A compound as in claim 1, wherein the compound is 2-(3,4,5-trimethoxybenzoyl)-isoxazolidine.

3. A compound as in claim 1, wherein the compound is 2-(3,4-dimethoxybenzoyl)-isoxazolidine.

4. A compound as in claim 1, wherein the compound is 2-(4-acetoxy-3,5-dimethoxybenzoyl)-isoxazolidine.

5. A compound as in claim 1; wherein the compound is 2-(4-acetoxy-3,5-dimethoxycinnamoyl)-isoxazolidine.

6. A compound as in claim 1, wherein the compound is 2-(3,5-dimethoxy-4-hydroxybenzoyl)-isoxazolidine.

7. A compound as in claim 1, wherein the compound is 2-(3,5-dimethoxy-4-hydroxycinnamoyl)-isoxazolidine.

* * * * *